United States Patent
Liu et al.

(10) Patent No.: US 11,082,858 B2
(45) Date of Patent: Aug. 3, 2021

(54) FREQUENCY SPECTRUM ALLOCATION METHOD AND APPARATUS FOR OVERLAPPED MULTIPLEXING SYSTEM, STORAGE MEDIUM AND PROCESSOR

(71) Applicant: SHEN ZHEN KUANG-CHI HEZHONG TECHNOLOGY LTD, Shenzhen (CN)

(72) Inventors: Ruopeng Liu, Shenzhen (CN); Chunlin Ji, Shenzhen (CN); Shasha Zhang, Shenzhen (CN)

(73) Assignee: SHEN ZHEN KUANG-CHI HEZHONG TECHNOLOGY LTD, Shenzhen (CN)

( * ) Notice: Subject to any disclaimer, the term of this patent is extended or adjusted under 35 U.S.C. 154(b) by 54 days.

(21) Appl. No.: 16/587,662

(22) Filed: Sep. 30, 2019

(65) Prior Publication Data

US 2020/0029223 A1 Jan. 23, 2020

Related U.S. Application Data (63) Continuation of application No. PCT/CN2018/079725, filed on Mar. 21, 2018.

(30) Foreign Application Priority Data

Mar. 30, 2017 (CN) .......................... 201710202597.1

(51) Int. Cl.
*H04W 16/14* (2009.01)
*H04L 27/26* (2006.01)
(Continued)

(52) U.S. Cl.
CPC ......... *H04W 16/14* (2013.01); *H04L 27/2627* (2013.01); *H04W 72/0453* (2013.01); *H04W 72/08* (2013.01); *H04J 3/1694* (2013.01)

(58) Field of Classification Search
CPC . H04W 16/14; H04W 72/0453; H04W 72/08; H04L 27/2627; H04L 5/0044; H04L 5/26; H04L 5/22; H04J 3/1694
See application file for complete search history.

(56) References Cited

U.S. PATENT DOCUMENTS

2016/0191175 A1* 6/2016 Hwang .................. H04B 15/00
370/329

FOREIGN PATENT DOCUMENTS

| CN | 101431393 A | 5/2009 |
|---|---|---|
| CN | 101485125 A | 7/2009 |

(Continued)

OTHER PUBLICATIONS

International Search Report for corresponding application PCT/CN2018/079725 filed Mar. 21, 2018; dated May 31, 2018.

(Continued)

*Primary Examiner* — Said M Elnoubi
(74) *Attorney, Agent, or Firm* — Cantor Colburn LLP (57) ABSTRACT

The present invention discloses a frequency spectrum allocation method and apparatus for an overlapped multiplexing system, a storage medium, and a processor. The method includes: determining channel bandwidth for an overlapped multiplexing system, and obtaining first bandwidth for an overlapped multiplexing signal, where the first bandwidth is processing bandwidth for the overlapped multiplexing signal; obtaining second bandwidth other than the first bandwidth in the channel bandwidth for the overlapped multiplexing system; and allocating the second bandwidth to a non-overlapped-multiplexing signal. The present invention resolves a prior-art technical problem that bandwidth occupied by an overlapped multiplexing system is relatively wide but actual processing bandwidth is relatively narrow, causing a waste of frequency spectrum resources.

17 Claims, 3 Drawing Sheets

(51) Int. Cl.
*H04W 72/04* (2009.01)
*H04W 72/08* (2009.01)
*H04J 3/16* (2006.01)

(56) References Cited

FOREIGN PATENT DOCUMENTS

| | | |
|---|---|---|
| CN | 102246581 A | 11/2011 |
| CN | 105553536 A | 5/2016 |
| EP | 2506624 A1 | 10/2012 |
| EP | 2573990 A1 | 3/2013 |
| JP | 0621879 A | 1/1994 |
| JP | 761029 B2 | 6/1995 |
| JP | 2016534672 A | 11/2016 |
| WO | 2008019529 A1 | 2/2008 |

OTHER PUBLICATIONS

Anass Benjebbour, "Non-orthogonal Multiple Access (NOMA): Concept, Performance Evaluation and Experimental Trials", 2015 IEEE.

European Search Report for corresponding application EP 18 77 7141; Report dated Nov. 27, 2020.

Hui Jiang, "A New Time Division Multiplexing Technique", Beijing University of Posts and Telecommunications, 2007.

Intel Corporation, "Grant-free UL transmissions in NR", 3GPP TSG-RAN WG1 #86bis R1-1609499 Lisbon, Portugal, Oct. 10-14, 2016.

Jian Wang, "The Prefix Design and Performance Analysis of DFT-based Overlapped Frequency DivisionMultiplexing (OvFDM-DFT) System", Proceedings of IWSDA, 2007.

Jiang Hui, "Overlapping frequency-time division multiplexing", The Journal of China Universities of Posts and Telecommunications; 16 (2), 8-13, Apr. 2009.

Xia Zhang, "The Analysis of Coded Overlapped Time Division Multiplexing System", Beijing University of Posts and Telecommunications, 2010 IEEE.

\* cited by examiner

FREQUENCY SPECTRUM ALLOCATION METHOD AND APPARATUS FOR OVERLAPPED MULTIPLEXING SYSTEM, STORAGE MEDIUM AND PROCESSOR

CROSS REFERENCE TO RELATED APPLICATION

This application is a continuation of International Patent Application Number PCT/CN2018/079725 which was filed on Mar. 21, 2018 claiming priority to Chinese patent application No. 201710202597.1 filed on Mar. 30, 2017, the contents of which said applications are herein incorporated by reference in their entirety.

TECHNICAL FIELD

The present invention relates to the signal processing field, and specifically, to a frequency spectrum allocation method and apparatus for an overlapped multiplexing system, a storage medium, and a processor.

BACKGROUND

OvTDM (Overlapped Time Division Multiplexing) is achieved by applying an overlapped multiplexing principle to time domain. An OvTDM system is a coding system with high frequency spectrum efficiency, no coding surplus, a high coding gain, and low decoding complexity that is generated through shift overlapping of data weighted multiplexing waveforms in time domain.

It can be learned from characteristics of an OvTDM (Overlapped Time Division Multiplexing) signal that, a larger quantity K of overlapped multiplexing times indicates higher spectrum efficiency, and occupied bandwidth does not increase with K increases but is related only to a multiplexing waveform. This reflects a large advantage of the OvTDM system. Common multiplexing waveforms include Chebyshev, Gaussian, Hamming, Hann, Blackman, Blackman-Harris, Bartlett, Bartlett-Hanning, Bohman, flat top, Nuttall, Parzen, Taylor, Tukey, Kaiser, and triangular waveforms, and evolved waveforms based on the foregoing waveforms. The OvTDM system has relatively good performance when any foregoing waveform is used as a multiplexing waveform. However, because performance of each waveform slightly varies, a time-frequency-domain characteristic corresponding to the waveform also varies.

In the OvTDM system, because of a spectrum characteristic of a multiplexing waveform, corresponding frequency spectrum resource bandwidth in an actual signal processing process is generally wide, but actual processing bandwidth for an OvTDM signal is relatively narrow. The spectrum characteristic thereof may be shown in FIG. 1. Bandwidth actually occupied by a signal is referred to as $W_b$, and signal energy is mainly concentrated within bandwidth $w_a$. Therefore, during actual processing, matched filtering is first performed on a received OvTDM signal, to filter out out-of-band signal interference, and then a signal within $w_a$ is processed. However, because of an exclusive characteristic of inter-symbol overlapped multiplexing of the OvTDM system, when OvTDM demodulation processing is performed on a signal obtained through filtering, a specific loss of corresponding system performance is caused. In addition, out-of-band resources are not properly used, thereby causing a waste of some frequency spectrum resources.

For a prior-art problem that bandwidth occupied by an overlapped multiplexing system is relatively wide but actual processing bandwidth is relatively narrow, causing a waste of frequency spectrum resources, no effective solution is currently proposed.

SUMMARY

Embodiments of the present invention provide a frequency spectrum allocation method and apparatus for an overlapped multiplexing system, a storage medium, and a processor, to at least resolve a prior-art technical problem that bandwidth occupied by an overlapped multiplexing system is relatively wide but actual processing bandwidth is relatively narrow, causing a waste of frequency spectrum resources.

According to an aspect of the embodiments of the present invention, a frequency spectrum allocation method for an overlapped multiplexing system is provided, including: determining channel bandwidth for an overlapped multiplexing system, and obtaining first bandwidth for an overlapped multiplexing signal, where the first bandwidth is processing bandwidth for the overlapped multiplexing signal; obtaining second bandwidth other than the first bandwidth in the channel bandwidth for the overlapped multiplexing system; and allocating the second bandwidth to a non-overlapped-multiplexing signal.

Further, a pre-allocated signal type and carrier frequency that correspond to the allocation of the second bandwidth are obtained; and a non-overlapped-multiplexing signal corresponding to the signal type and the carrier frequency is transmitted at the carrier frequency corresponding to the second bandwidth.

Further, it is detected whether a non-overlapped-multiplexing signal whose communication frequency band overlaps a communication frequency band of the overlapped multiplexing signal is valid; and the second bandwidth is allocated to any one or more of valid non-overlapped-multiplexing signals.

Further, coding and modulation are performed on the overlapped multiplexing signal according to a modulation method for the overlapped multiplexing signal, and coding and modulation are performed on the non-overlapped-multiplexing signal according to a modulation method for the non-overlapped-multiplexing signal; and a coded and modulated overlapped multiplexing signal and a coded and modulated non-overlapped-multiplexing signal are separately transmitted to a decoder side through a channel within corresponding bandwidth.

Further, the decoder side parses out, from a received joint signal, the coded and modulated overlapped multiplexing signal and the coded and modulated non-overlapped-multiplexing signal; demodulates the non-overlapped-multiplexing signal according to a demodulation method corresponding to the non-overlapped-multiplexing signal, to obtain the non-overlapped-multiplexing signal and obtain a channel parameter corresponding to the non-overlapped-multiplexing signal; and demodulates the coded and modulated overlapped multiplexing signal according to a demodulation method corresponding to the overlapped multiplexing signal and the channel parameter corresponding to the non-overlapped-multiplexing signal, to obtain the overlapped multiplexing signal.

According to another aspect of the embodiments of the present invention, a frequency spectrum allocation apparatus for an overlapped multiplexing system is provided, including: a first obtaining module, configured to: determine channel bandwidth for an overlapped multiplexing system, and obtain first bandwidth for an overlapped multiplexing signal, where the first bandwidth is processing bandwidth for the overlapped multiplexing signal; a second obtaining module, configured to: obtain second bandwidth other than the first bandwidth in the channel bandwidth for the overlapped multiplexing system; and an allocation module, configured to: allocate the second bandwidth to a non-overlapped-multiplexing signal.

Further, an obtaining submodule is configured to: obtain a pre-allocated signal type and carrier frequency that correspond to the allocation of the second bandwidth; and a second bandwidth signal transmission submodule is configured to: transmit, at the carrier frequency corresponding to the second bandwidth, a non-overlapped-multiplexing signal corresponding to the signal type and the carrier frequency.

Further, a detection submodule is configured to: detect whether a non-overlapped-multiplexing signal whose communication frequency band overlaps a communication frequency band of the overlapped multiplexing signal is valid; and an allocation submodule is configured to: allocate the second bandwidth to any one or more of valid non-overlapped-multiplexing signals.

Further, a coding and modulation module is configured to: perform coding and modulation on the overlapped multiplexing signal according to a modulation method for the overlapped multiplexing signal, and perform coding and modulation on the non-overlapped-multiplexing signal according to a modulation method for the non-overlapped-multiplexing signal; and a transmission module is configured to: separately transmit a coded and modulated overlapped multiplexing signal and a coded and modulated non-overlapped-multiplexing signal to a decoder side through a channel within corresponding bandwidth.

Further, a parsing module is configured to: parse out, by the decoder side from a received joint signal, the coded and modulated overlapped multiplexing signal and the coded and modulated non-overlapped-multiplexing signal; a first demodulation module is configured to: demodulate the non-overlapped-multiplexing signal according to a demodulation method corresponding to the non-overlapped-multiplexing signal, to obtain the non-overlapped-multiplexing signal and obtain a channel parameter corresponding to the non-overlapped-multiplexing signal; and a second demodulation module is configured to: demodulate the coded and modulated overlapped multiplexing signal according to a demodulation method corresponding to the overlapped multiplexing signal and the channel parameter corresponding to the non-overlapped-multiplexing signal, to obtain the overlapped multiplexing signal.

According to another aspect of the embodiments of the present invention, a storage medium is further provided, where the storage medium includes a stored program, and when the program runs, a device on which the storage medium is located is controlled to perform the foregoing frequency spectrum allocation method for an overlapped multiplexing system.

According to another aspect of the embodiments of the present invention, a processor is further provided, where the processor is configured to run a program, and when the program runs, the foregoing frequency spectrum allocation method for an overlapped multiplexing system is performed.

In the embodiments of the present invention, the channel bandwidth for the overlapped multiplexing system is determined, the first bandwidth for the overlapped multiplexing signal is obtained, the second bandwidth other than the first bandwidth in the channel bandwidth for the overlapped multiplexing system is obtained, and the second bandwidth is allocated to the non-overlapped-multiplexing signal. In the foregoing solution, non-processing bandwidth in actual bandwidth for the overlapped multiplexing signal is allocated to another traditional signal for use, thereby implementing proper use of spectrum resources and resolving the prior-art technical problem that bandwidth occupied by an overlapped multiplexing system is relatively wide but actual processing bandwidth is relatively narrow, causing a waste of frequency spectrum resources.

BRIEF DESCRIPTION OF DRAWINGS

The drawings described herein provide further understanding of the present invention, and form a part of this application. Schematic embodiments of the present invention and descriptions thereof are used to explain the present invention but do not constitute an inappropriate limitation on the present invention. In the drawings.

DESCRIPTION OF EMBODIMENTS

To make a person skilled in the art better understand solutions of the present invention, the following clearly and completely describes the technical solutions in the embodiments of the present invention with reference to the accompanying drawings in the embodiments of the present invention. Apparently, the described embodiments are some but not all of the embodiments of the present invention. All other embodiments obtained by a person of ordinary skill in the art based on the embodiments of the present invention without creative efforts shall fall within the protection scope of the present invention.

It should be noted that terms such as "first" and "second" in the specification, claims, and accompanying drawings of the present invention are used to distinguish between similar objects, and are not necessarily used to describe a particular sequence or order. It should be understood that data used in such a way may be interchangeable in a proper circumstance, so that the embodiments of the present invention described herein can be implemented in a sequence other than those shown in the drawings or described herein. Moreover, terms "including", "having", and any other variants mean to cover a non-exclusive inclusion, for example, a process, method, system, product, or device that includes a list of steps or units is not necessarily limited to those steps or units that are expressly listed, but may include other units not expressly listed or inherent to such a process, method, system, product, or device.

EMBODIMENT 1

According to this embodiment of the present invention, an embodiment of a frequency spectrum allocation method for an overlapped multiplexing system is provided. It should be noted that steps shown in a flowchart of a drawing may be performed in a computer system of a group of computer executable instructions. In addition, although a logical sequence is shown in the flowchart, in some circumstances, the shown or described steps may be performed in a sequence different from the sequence herein.

Figure 2:
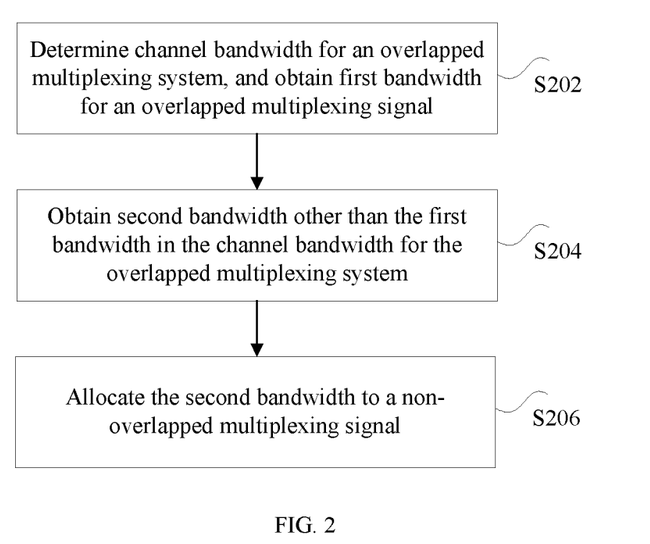
FIG. 2 is a flowchart of a frequency spectrum allocation method for an overlapped multiplexing system according to an embodiment of the present invention.

FIG. 2 is a flowchart of a frequency spectrum allocation method for an overlapped multiplexing system according to an embodiment of the present invention. In all the following embodiments, an example in which the method is applied to an overlapped multiplexing system in time domain is used. As shown in FIG. 2, the method includes the following steps:

Step S202: Determine channel bandwidth for an overlapped multiplexing system, and obtain first bandwidth for an overlapped multiplexing signal, where the first bandwidth is processing bandwidth for the overlapped multiplexing signal.

Figure 1:
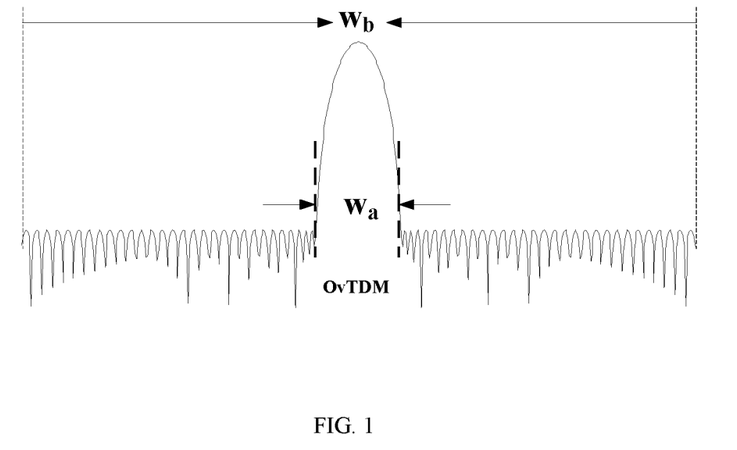
FIG. 1 is a schematic diagram of a frequency spectrum characteristic of an overlapped multiplexing signal in the prior art.

With reference to a schematic diagram of a frequency spectrum characteristic of an overlapped multiplexing signal in FIG. 1, it can be learned that, in an overlapped multiplexing system, bandwidth actually occupied by a signal is $w_b$, and processing bandwidth is only $w_a$, that is, usually, OvTDM signals are mainly concentrated within main lobe bandwidth, and side lobe signal energy is very low.

Specifically, processing bandwidth is used to indicate that processing bandwidth for an overlapped multiplexing signal may be obtained in the following two manners: (1) Obtain the processing bandwidth for the overlapped multiplexing signal based on boundary power spectrum density bandwidth for the signal. The boundary power spectrum density bandwidth means that bandwidth corresponding to an interval in which power of a multiplexing waveform attenuates from a highest center point to a specified level is system processing bandwidth. Common specified levels include 35 dB, 50 dB, and the like. Different multiplexing waveforms' processing bandwidth are different. (2) Obtain the processing bandwidth for the signal based on energy percentage bandwidth. The energy percentage bandwidth means that a bandwidth range in which a signal energy percentage reaches a specific percentage of total energy is referred to as processing bandwidth. Common energy percentages include 99%, 99.5%, and the like.

In an optional embodiment, as shown in FIG. 1, for example, processing bandwidth for a signal is obtained based on energy percentage bandwidth. A bandwidth range in which signal energy reaches 99%-100% is referred to as processing bandwidth $w_a$, where a value of $w_a$ is related to a characteristic of a multiplexing waveform; and bandwidth actually occupied by a signal is referred to as $w_b$.

Step S204: Obtain second bandwidth other than the first bandwidth in the channel bandwidth for the overlapped multiplexing system. Still with reference to the example shown in FIG. 1, $w_b$-$w_a$ is the second bandwidth.

Step S206: Allocate the second bandwidth to a non-overlapped-multiplexing signal.

Figure 3:
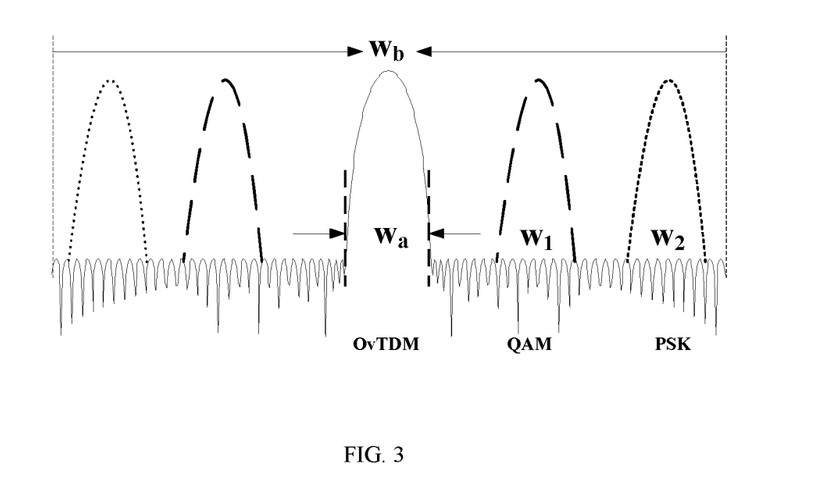
FIG. 3 is a schematic diagram of optional spectrum member allocation according to an embodiment of this application.

Specifically, the non-overlapped-multiplexing signal may be a traditional signal in a wireless transmission environment, for example, a QAM signal and a PSK signal. FIG. 3 is a schematic diagram of optional spectrum member allocation according to an embodiment of this application. As shown in FIG. 3, $w_a$ is the processing bandwidth for the overlapped multiplexing signal, $w_b$-$w_a$ is the second bandwidth, and the second bandwidth is allocated to the QAM signal and the PSK signal. Bandwidth for the QAM signal is $w_1$, and bandwidth for the PSK signal is $w_2$.

In an optional embodiment, a Chebyshev multiplexing waveform is used as an example. Bandwidth occupied by an OvTDM signal obtained through overlapped multiplexing and superposition is $w_b$, and signal energy is concentrated within bandwidth $w_a$ corresponding to 99.9%. A frequency spectrum resource re-allocation method is: allocating a spectrum resource to another existing communication signal for use within the bandwidth $w_b$-$w_a$, so as to ensure that no interference is caused to the OvTDM signal without wasting spectrum resources, and further improve a channel capacity within the bandwidth $w_b$. A signal corresponding to a spectrum resource re-allocated within the bandwidth $w_b$ may be expressed as $y=x_{ov}+x_{trad}+\varepsilon$, where y indicates a joint signal, $x_{ov}$ indicates the OvTDM signal, which occupies a bandwidth range of $w_a$, $x_{trad}$ indicates a traditional communication signal, which occupies a bandwidth range of $w_b$-$w_a$, and $\varepsilon$ indicates noise.

It is well known that there are many traditional communication signals in an actual wireless environment, for example, a satellite signal, a broadcast and television signal, a broadcast signal, and a wireless communication signal. Each type of signal corresponds to a respective bearer carrier frequency range. In the foregoing solution, for a problem that bandwidth occupied by an OvTDM system is relatively wide but actual processing bandwidth is relatively narrow, causing a specific waste of frequency spectrum resources, a new frequency spectrum resource allocation method is proposed to combine the OvTDM system with a traditional communications system, so as to properly allocate frequency spectrum resources for the OvTDM system and the traditional communications system within a fixed frequency band range. Therefore, frequency spectrum resources can be properly used. In addition, because the actual processing bandwidth for the OvTDM system is relatively narrow and is within the occupied bandwidth, a channel capacity greatly increases.

It can be learned from the foregoing that, in the foregoing embodiment of this application, the channel bandwidth for the overlapped multiplexing system is determined, the first bandwidth for the overlapped multiplexing signal is obtained, the second bandwidth other than the first bandwidth in the channel bandwidth for the overlapped multiplexing system is obtained, and the second bandwidth is allocated to the non-overlapped-multiplexing signal. In the foregoing solution, non-processing bandwidth in actual bandwidth for the overlapped multiplexing signal is allocated to another traditional signal for use, thereby implementing proper use of spectrum resources and resolving the prior-art technical problem that bandwidth occupied by an overlapped multiplexing system is relatively wide but actual processing bandwidth is relatively narrow, causing a waste of frequency spectrum resources.

Optionally, according to the foregoing embodiment of this application, allocating the second bandwidth to a non-overlapped-multiplexing signal includes the following steps:

Step S2061: Obtain a pre-allocated signal type and carrier frequency that correspond to the second bandwidth.

Step S2063: Transmit, at the carrier frequency corresponding to the second bandwidth, a non-overlapped-multiplexing signal corresponding to the signal type and the carrier frequency.

Herein, it should be noted that the foregoing solution is a solution fixed allocation, that is, a corresponding signal is transmitted within the second bandwidth according to a pre-allocated parameter.

It can be learned from the foregoing that, the foregoing embodiment of this application provides a signal allocation method for the second bandwidth in a scenario in which a spectrum for the overlapped multiplexing signal is fixed and bandwidth is fixed. In this scenario, a corresponding signal is sent within the second bandwidth according to the preset signal type and the preset carrier frequency of the second bandwidth, thereby implementing proper use of spectrum resources for the overlapped multiplexing signal.

Optionally, according to the foregoing embodiment of this application, allocating the second bandwidth to a non-overlapped-multiplexing signal includes the following steps:

Step S2065: Detect whether a non-overlapped-multiplexing signal whose communication frequency band overlaps a communication frequency band of the overlapped multiplexing signal is valid.

Specifically, the non-overlapped-multiplexing signal whose communication frequency band overlaps the communication frequency band of the overlapped multiplexing signal is located in a same wireless transmission environment as the overlapped multiplexing signal. The overlapped multiplexing signal is a signal allowed to be transmitted in a carrier frequency range to which the overlapped multiplexing signal belongs, that is, is a valid signal.

Step S2067: Allocate the second bandwidth to any one or more of valid non-overlapped-multiplexing signals.

Herein, it should be noted that, the foregoing allocation is a blind allocation method, that is, a signal matching the second bandwidth is not limited, but a corresponding signal is automatically matched to the second bandwidth when the overlapped multiplexing signal is transmitted on an actual wireless channel.

It can be learned from the foregoing that, in the foregoing embodiment of this application, it is detected whether the non-overlapped-multiplexing signal whose communication frequency band overlaps the communication frequency band of the overlapped multiplexing signal is valid; and the second bandwidth is allocated to any one or more of the valid non-overlapped-multiplexing signals. In the foregoing solution, in a scenario of an actual wireless channel transmission environment, a signal matching the second bandwidth is not limited, but a corresponding signal is automatically matched to the second bandwidth when the overlapped multiplexing signal is transmitted on an actual wireless channel. This not only improves utilization of frequency spectrum resources for the overlapped multiplexing signal, but also implements automatic matching for the second bandwidth.

Optionally, according to the foregoing embodiment of this application, after allocating the second bandwidth to a non-overlapped-multiplexing signal on a channel, the method further includes the following steps:

Step S208: Perform coding and modulation on the overlapped multiplexing signal according to a modulation method for the overlapped multiplexing signal, and perform coding and modulation on the non-overlapped-multiplexing signal according to a modulation method for the non-overlapped-multiplexing signal.

In the foregoing step, a method for performing coding and modulation on a joint signal by a transmit end is: using a coding and modulation method corresponding to the signal, for example, using overlapped multiplexing coding and modulation for an OvTDM signal, and using a corresponding coding and modulation scheme for a QAM signal or a PSK signal.

Step S2010: Separately transmit a coded and modulated overlapped multiplexing signal and a coded and modulated non-overlapped-multiplexing signal to a decoder side through the channel within corresponding bandwidth.

In the foregoing step, after coding and modulation are performed on a corresponding signal, the non-overlapped-multiplexing signal is transmitted within the second bandwidth.

It can be learned from the foregoing that, in the foregoing embodiment of this application, coding and modulation are performed on the overlapped multiplexing signal according to the modulation method for the overlapped multiplexing signal, and coding and modulation are performed on the non-overlapped-multiplexing signal according to the modulation method for the non-overlapped-multiplexing signal; and the coded and modulated overlapped multiplexing signal and the coded and modulated non-overlapped-multiplexing signal are separately transmitted to the decoder side through the channel within the corresponding bandwidth. In the foregoing solution, signals are coded, modulated, and transmitted separately, so that various signals do not interfere with each other during transmission on a channel for the overlapped multiplexing signal.

Optionally, according to the foregoing embodiment of this application, after separately transmitting a coded and modulated overlapped multiplexing signal and a coded and modulated non-overlapped-multiplexing signal to a decoder side through the channel within corresponding bandwidth, the method further includes the following steps:

Step S2012: The decoder side parses out, from a received joint signal, the coded and modulated overlapped multiplexing signal and the coded and modulated non-overlapped-multiplexing signal.

Specifically, the joint signal includes the coded and modulated overlapped multiplexing signal and the coded and modulated non-overlapped-multiplexing signal. A time-domain characteristic of the non-overlapped-multiplexing signal transmitted on the channel for the overlapped multiplexing signal is known, and each type of signal corresponds to a respective demodulation and decoding method. Therefore, the non-overlapped-multiplexing signal can be obtained or demodulated according to a corresponding method. Usually, a demodulation process includes steps such as matched filtering, down-sampling, and signal detection.

Step S2014: Demodulate the non-overlapped-multiplexing signal according to a demodulation method corresponding to the non-overlapped-multiplexing signal, to obtain the non-overlapped-multiplexing signal and obtain a channel parameter corresponding to the non-overlapped-multiplexing signal.

Step S2016: Demodulate the coded and modulated overlapped multiplexing signal according to a demodulation method corresponding to the overlapped multiplexing signal and the channel parameter corresponding to the non-overlapped-multiplexing signal, to obtain the overlapped multiplexing signal.

The non-overlapped-multiplexing signal has been demodulated in step S2014. Then the overlapped multiplexing signal can be demodulated and decoded. Although the non-overlapped-multiplexing signal is in an out-of-band frequency spectrum, it still affects the overlapped multiplexing signal. Therefore, in a process of demodulating the overlapped multiplexing signal, the overlapped multiplexing signal needs to be demodulated according to the channel parameter corresponding to the non-overlapped-multiplexing signal.

A demodulated signal is decoded according to an existing common method, for example, a maximum likelihood (ML, Maximum Likelihood) algorithm, a zero forcing (ZF, Zero Forcing) algorithm, a minimum mean square error (MMSE, Minimum Mean Square Error) algorithm, a sphere decoder (SD, Sphere Decoder) algorithm, or a Bayesian Monte Carlo approximation decoding algorithm.

It can be learned from the foregoing that, in the foregoing solution of this application, the preconfigured decoder side parses out, from the received joint signal, the coded and modulated overlapped multiplexing signal and the coded and modulated non-overlapped-multiplexing signal; demodulates the non-overlapped-multiplexing signal according to the demodulation method corresponding to the non-overlapped-multiplexing signal, to obtain the non-overlapped-multiplexing signal and obtain the channel parameter corresponding to the non-overlapped-multiplexing signal; and demodulates the coded and modulated overlapped multiplexing signal according to the demodulation method corresponding to the overlapped multiplexing signal and with reference to the channel parameter corresponding to the non-overlapped-multiplexing signal, to obtain the overlapped multiplexing signal. A plurality of types of signals exist in occupied bandwidth, and do not interfere with each other. Therefore, in the foregoing solution, spectrum resources are properly used, and a channel capacity within the frequency band range also increases.

The following describes the transmit end and the receive end of the overlapped multiplexing system.

Figure 4:
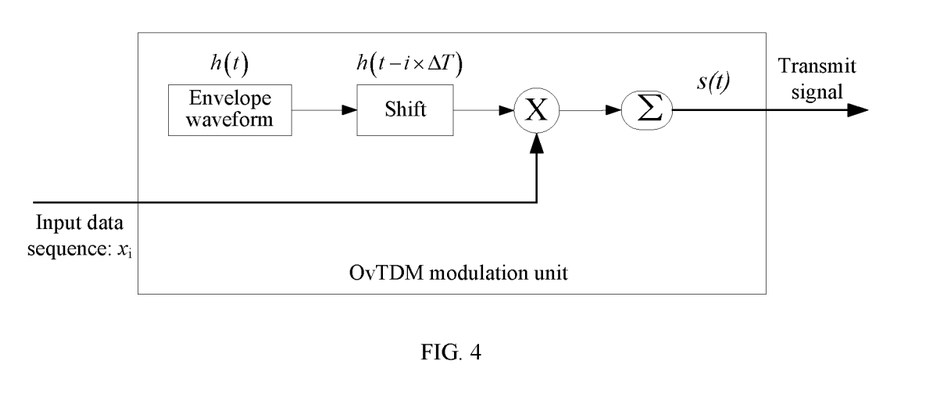
FIG. 4 is a schematic diagram of an optional transmit end of an overlapped multiplexing system according to an embodiment of the present invention.

FIG. 4 is a schematic diagram of an optional transmit end of an overlapped multiplexing system according to an embodiment of the present invention. An OvTDM system is used as an example. In an optional solution, a system block diagram of an OvTDM transmit end is shown in FIG. 4. The transmit end may encode an input data sequence $x_i$, namely, an input symbol sequence, by using an OvTDM modulation unit. First, in a design, a transmit signal envelope waveform h(t), namely, the foregoing multiplexing waveform, may be generated. A specific time shift is performed on the envelope waveform h(t) based on a shift register, to form transmit signal envelope waveforms h(t−i×ΔT) of other moments. The input symbol sequence $x_i$ is multiplied by an envelope waveform of a h(t−i×ΔT) of a corresponding moment, to obtain a to-be-transmitted signal waveform $x_i$h(t−i×ΔT) of each moment. To-be-transmitted signal waveforms $x_i$h(t−i×ΔT) are superposed to form a transmit signal waveform, namely, a coded signal:

$$s(t) = \sum_i x_i h(t - i \times \Delta T).$$

Figure 5:
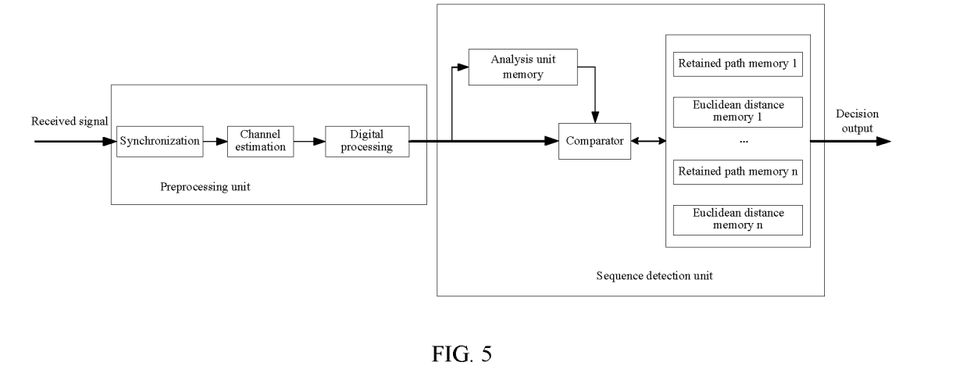
FIG. 5 is a schematic diagram of an optional receive end of an overlapped multiplexing system according to an embodiment of the present invention.

FIG. 5 is a schematic diagram of an optional receive end of an overlapped multiplexing system according to an embodiment of the present invention. In an optional solution, after receiving a coded signal sent by a transmit end, the receive end performs matched filtering on the received signal, then separately performs sampling and decoding on the signal, and finally performs decision and outputs a bit stream. As shown in FIG. 5, preprocessing is performed on the coded signal to obtain a processed coded signal. The preprocessing includes: synchronizing the received signal to keep synchronous with a system. The synchronization mainly includes timing synchronization and carrier synchronization. After the synchronization is completed, channel estimation is performed on the received signal, to estimate a parameter of an actual transmission channel; and digital processing is performed on the received signal in each frame according to a sampling principle. Then a received waveform is divided according to a waveform transmission time interval, and a waveform obtained through division is decoded according to a specific decoding algorithm.

EMBODIMENT 2

Figure 6:
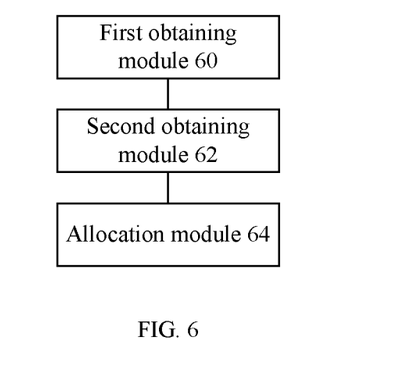
FIG. 6 is a schematic diagram of a frequency spectrum allocation apparatus for an overlapped multiplexing system according to an embodiment of the present invention.

According to an embodiment of the present invention, an embodiment of a frequency spectrum allocation apparatus for an overlapped multiplexing system is provided. FIG. 6 is a schematic diagram of a frequency spectrum allocation apparatus for an overlapped multiplexing system according to an embodiment of the present invention. As shown in FIG. 6, the apparatus includes:

a first obtaining module 60, configured to: determine channel bandwidth for an overlapped multiplexing system, and obtain first bandwidth for an overlapped multiplexing signal, where the first bandwidth is processing bandwidth for the overlapped multiplexing signal;

a second obtaining module 62, configured to: obtain second bandwidth other than the first bandwidth in the channel bandwidth for the overlapped multiplexing system; and an allocation module 64, configured to: allocate the second bandwidth to a non-overlapped-multiplexing signal.

It can be learned from the foregoing that, in the foregoing embodiment of this application, the first obtaining module determines the channel bandwidth for the overlapped multiplexing system, and obtains the first bandwidth for the overlapped multiplexing signal; the second obtaining module obtains the second bandwidth other than the first bandwidth in the channel bandwidth for the overlapped multiplexing system; and the allocation module allocates the second bandwidth to the non-overlapped-multiplexing signal. In the foregoing solution, non-processing bandwidth in actual bandwidth for the overlapped multiplexing signal is allocated to another traditional signal for use, thereby implementing proper use of spectrum resources and resolving the prior-art technical problem that bandwidth occupied by an overlapped multiplexing system is relatively wide but actual processing bandwidth is relatively narrow, causing a waste of frequency spectrum resources.

Optionally, according to the foregoing embodiment of this application, the allocation module 34 includes:

an obtaining submodule, configured to: obtain a pre-allocated signal type and carrier frequency that correspond to the allocation of the second bandwidth; and a second bandwidth signal transmission submodule, configured to: transmit, at the carrier frequency corresponding to the second bandwidth, a non-overlapped-multiplexing signal corresponding to the signal type and the carrier frequency.

Optionally, according to the foregoing embodiment of this application, the allocation module 34 includes:

a detection submodule, configured to: detect whether a non-overlapped-multiplexing signal whose communication frequency band overlaps a communication frequency band of the overlapped multiplexing signal is valid; and an allocation submodule, configured to: allocate the second bandwidth to any one or more of valid non-overlapped-multiplexing signals.

Optionally, according to the foregoing embodiment of this application, the apparatus further includes:

a coding and modulation module, configured to: perform coding and modulation on the overlapped multiplexing signal according to a modulation method for the overlapped multiplexing signal, and perform coding and modulation on the non-overlapped-multiplexing signal according to a modulation method for the non-overlapped-multiplexing signal; and a transmission module, configured to: separately transmit a coded and modulated overlapped multiplexing signal and a coded and modulated non-overlapped-multiplexing signal to a decoder side through a channel within corresponding bandwidth.

Optionally, according to the foregoing embodiment of this application, the apparatus further includes:

a parsing module, configured to: parse out, by the decoder side from a received joint signal, the coded and modulated overlapped multiplexing signal and the coded and modulated non-overlapped-multiplexing signal;

a first demodulation module, configured to: demodulate the non-overlapped-multiplexing signal according to a demodulation method corresponding to the non-overlapped-multiplexing signal, to obtain the non-overlapped-multiplexing signal and obtain a channel parameter corresponding to the non-overlapped-multiplexing signal; and a second demodulation module, configured to: demodulate the coded and modulated overlapped multiplexing signal according to a demodulation method corresponding to the overlapped multiplexing signal and the channel parameter corresponding to the non-overlapped-multiplexing signal, to obtain the overlapped multiplexing signal.

EMBODIMENT 3

According to an embodiment of the present invention, a storage medium is provided, where the storage medium includes a stored program, and when the program runs, a device on which the storage medium is located is controlled to perform the frequency spectrum allocation method for an overlapped multiplexing system according to any one of the implementations in Embodiment 1.

For details about the frequency spectrum allocation method for an overlapped multiplexing system, refer to Embodiment 1. Details are not described herein again.

EMBODIMENT 4

According to an embodiment of the present invention, a processor is provided, where the processor is configured to run a program, and when the program runs, the frequency spectrum allocation method for an overlapped multiplexing system according to any one of the implementations in Embodiment 1 is performed.

For details about the frequency spectrum allocation method for an overlapped multiplexing system, refer to Embodiment 1. Details are not described herein again.

Sequence numbers of the foregoing embodiments of the present invention are merely used for description, and do not indicate superiority or inferiority of the embodiments.

In the foregoing embodiments of the present invention, descriptions of the embodiments have respective emphases. For a part not described in detail in an embodiment, reference may be made to related descriptions in another embodiment.

In the several embodiments provided in this application, it should be understood that the disclosed technical content may be implemented in other manners. The described apparatus embodiments are merely examples. For example, the unit division is merely logical function division and may be other division in actual implementation. For example, a plurality of units or components may be combined or integrated into another system, or some features may be ignored or not performed. In addition, the shown or discussed mutual couplings or direct couplings or communication connections may be implemented by using some interfaces. The indirect couplings or communication connections between the units or modules may be implemented in electrical or other forms.

The units described as separate parts may or may not be physically separated, and parts shown as units may or may not be physical units, may be located in one position, or may be distributed on a plurality of units. Some or all of the units may be selected depending on actual requirements to achieve the objectives of the solutions of the embodiments.

In addition, functional units in the embodiments of the present invention may be integrated into one processing unit, or each of the units may exist alone physically, or two or more units may be integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of the present invention essentially, or the part contributing to the prior art, or all or some of the technical solutions may be implemented in the form of a software product. The computer software product is stored in a storage medium and includes several instructions for instructing a computer device (which may be a personal computer, a server, a network device, or the like) to perform all or some of the steps of the methods described in the embodiments of the present invention. The foregoing storage medium includes any medium that can store program code, such as a USB flash drive, a read-only memory (ROM, Read-Only Memory), a random access memory (RAM, Random Access Memory), a removable hard disk, a magnetic disk, or an optical disc.

The foregoing descriptions are merely preferred implementations of the present invention. It should be noted that, improvements and modifications may be further made by a person of ordinary skill in the art without departing from the principles of the present invention, and these improvements and modifications shall also be construed as falling within the protection scope of the present invention.

The invention claimed is:

1. A frequency spectrum allocation method for an overlapped multiplexing system, comprising:

determining channel bandwidth for an overlapped multiplexing system, and obtaining first bandwidth for an overlapped time division multiplexing signal, wherein the first bandwidth is processing bandwidth for the overlapped time division multiplexing signal, wherein the processing bandwidth for the overlapped time division multiplexing signal refers to a bandwidth range in which the overlapped time division multiplexing signal energy percentage reaches a specific percentage of total energy of the overlapped time division multiplexing signal;

obtaining second bandwidth other than the first bandwidth in the channel bandwidth for the overlapped multiplexing system; and allocating the second bandwidth to a non-overlapped-multiplexing signal.

2. The method according to claim 1, wherein the allocating the second bandwidth to a non-overlapped-multiplexing signal comprises:
obtaining a pre-allocated signal type and carrier frequency that correspond to the allocation of the second bandwidth; and
transmitting, at the carrier frequency corresponding to the second bandwidth, a non-overlapped-multiplexing signal corresponding to the signal type and the carrier frequency.

3. The method according to claim 2, wherein after the allocating the second bandwidth to a non-overlapped-multiplexing signal on a channel, the method further comprises:
performing coding and modulation on the overlapped time division multiplexing signal according to a modulation method for the overlapped time division multiplexing signal, and performing coding and modulation on the non-overlapped-multiplexing signal according to a modulation method for the non-overlapped-multiplexing signal; and
separately transmitting a coded and modulated overlapped time division multiplexing signal and a coded and modulated non-overlapped-multiplexing signal to a decoder side through the channel within corresponding bandwidth.

4. A processor, wherein the processor is configured to run a program, and when the program runs, the frequency spectrum allocation method for an overlapped multiplexing system according to claim 2 is performed.

5. The method according to claim 1, wherein the allocating the second bandwidth to a non-overlapped-multiplexing signal comprises:
detecting whether a non-overlapped-multiplexing signal whose communication frequency band overlaps a communication frequency band of the overlapped time division multiplexing signal is valid, wherein a non-overlapped-multiplexing signal is valid when this non-overlapped-multiplexing signal is allowed to be transmitted in a carrier frequency range to which the overlapped time division multiplexing signal belongs; and
allocating the second bandwidth to any one or more of valid non-overlapped-multiplexing signals.

6. The method according to claim 5, wherein after the allocating the second bandwidth to a non-overlapped-multiplexing signal on a channel, the method further comprises:
performing coding and modulation on the overlapped time division multiplexing signal according to a modulation method for the overlapped time division multiplexing signal, and performing coding and modulation on the non-overlapped-multiplexing signal according to a modulation method for the non-overlapped-multiplexing signal; and
separately transmitting a coded and modulated overlapped time division multiplexing signal and a coded and modulated non-overlapped-multiplexing signal to a decoder side through the channel within corresponding bandwidth.

7. A processor, wherein the processor is configured to run a program, and when the program runs, the frequency spectrum allocation method for an overlapped multiplexing system according to claim 5 is performed.

8. The method according to claim 1, wherein after the allocating the second bandwidth to a non-overlapped-multiplexing signal on a channel, the method further comprises:
performing coding and modulation on the overlapped time division multiplexing signal according to a modulation method for the overlapped time division multiplexing signal, and performing coding and modulation on the non-overlapped-multiplexing signal according to a modulation method for the non-overlapped-multiplexing signal; and
separately transmitting a coded and modulated overlapped time division multiplexing signal and a coded and modulated non-overlapped-multiplexing signal to a decoder side through the channel within corresponding bandwidth.

9. A processor, wherein the processor is configured to run a program, and when the program runs, the frequency spectrum allocation method for an overlapped multiplexing system according to claim 8 is performed.

10. A non-transitory storage medium, wherein the storage medium comprises a stored program, and when the program runs, a device on which the storage medium is located is controlled to perform the frequency spectrum allocation method for an overlapped multiplexing system according to claim 1.

11. A processor, wherein the processor is configured to run a program, and when the program runs, the frequency spectrum allocation method for an overlapped multiplexing system according to claim 1 is performed.

12. A frequency spectrum allocation apparatus for an overlapped multiplexing system, comprising a hardware processor and a memory, the hardware processor is configured to execute programming modules stored in the memory, and the programming modules comprise:
a first obtaining module, configured to: determine channel bandwidth for an overlapped multiplexing system, and obtain first bandwidth for an overlapped time division multiplexing signal, wherein the first bandwidth is processing bandwidth for the overlapped time division multiplexing signal, wherein the processing bandwidth for the overlapped time division multiplexing signal refers to a bandwidth range in which the overlapped time division multiplexing signal energy percentage reaches a specific percentage of total energy of the overlapped time division multiplexing signal;
a second obtaining module, configured to: obtain second bandwidth other than the first bandwidth in the channel bandwidth for the overlapped multiplexing system; and
an allocation module, configured to: allocate the second bandwidth to a non-overlapped-multiplexing signal.

13. The apparatus according to claim 12, wherein the allocation module comprises:
an obtaining submodule, configured to: obtain a pre-allocated signal type and carrier frequency that correspond to the allocation of the second bandwidth; and
a second bandwidth signal transmission submodule, configured to: transmit, at the carrier frequency corresponding to the second bandwidth, a non-overlapped-multiplexing signal corresponding to the signal type and the carrier frequency.

14. The apparatus according to claim 13, wherein the apparatus further comprises:
a coding and modulation module, configured to: perform coding and modulation on the overlapped time division multiplexing signal according to a modulation method for the overlapped time division multiplexing signal, and perform coding and modulation on the non-overlapped-multiplexing signal according to a modulation method for the non-overlapped-multiplexing signal; and a transmission module, configured to: separately transmit a coded and modulated overlapped time division multiplexing signal and a coded and modulated non-overlapped-multiplexing signal to a decoder side through a channel within corresponding bandwidth.

15. The apparatus according to claim 12, wherein the allocation module comprises:
 a detection submodule, configured to: detect whether a non-overlapped-multiplexing signal whose communication frequency band overlaps a communication frequency band of the overlapped time division multiplexing signal is valid, wherein a non-overlapped-multiplexing signal is valid when this non-overlapped-multiplexing signal is allowed to be transmitted in a carrier frequency range to which the overlapped time division multiplexing signal belongs; and
 an allocation submodule, configured to: allocate the second bandwidth to any one or more of valid non-overlapped-multiplexing signals.

16. The apparatus according to claim 15, wherein the apparatus further comprises:
 a coding and modulation module, configured to: perform coding and modulation on the overlapped time division multiplexing signal according to a modulation method for the overlapped time division multiplexing signal, and perform coding and modulation on the non-overlapped-multiplexing signal according to a modulation method for the non-overlapped-multiplexing signal; and
 a transmission module, configured to: separately transmit a coded and modulated overlapped time division multiplexing signal and a coded and modulated non-overlapped-multiplexing signal to a decoder side through a channel within corresponding bandwidth.

17. The apparatus according to claim 12, wherein the programming modules further comprise:
 a coding and modulation module, configured to: perform coding and modulation on the overlapped time division multiplexing signal according to a modulation method for the overlapped time division multiplexing signal, and perform coding and modulation on the non-overlapped-multiplexing signal according to a modulation method for the non-overlapped-multiplexing signal; and
 a transmission module, configured to: separately transmit a coded and modulated overlapped time division multiplexing signal and a coded and modulated non-overlapped-multiplexing signal to a decoder side through a channel within corresponding bandwidth.

\* \* \* \* \*